(12) United States Patent
Krall, Jr. et al.

(10) Patent No.: US 8,234,883 B2
(45) Date of Patent: Aug. 7, 2012

(54) APPARATUS AND METHOD FOR TEMPERING GLASS SHEETS

(75) Inventors: William R. Krall, Jr., Gibsonia, PA (US); William R. Siskos, Delmont, PA (US); Thomas M. Sailock, Lower Burrell, PA (US); Joseph Medzius, Cranberry, PA (US); DeWitt W. Lampman, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 247 days.

(21) Appl. No.: 11/288,708

(22) Filed: Nov. 29, 2005

(65) Prior Publication Data

US 2007/0122580 A1    May 31, 2007

(51) Int. Cl.
*C03B 25/00* (2006.01)
*C03B 25/04* (2006.01)
*C03B 25/08* (2006.01)

(52) U.S. Cl. .................... 65/114; 65/95; 65/104
(58) Field of Classification Search .................. 428/38; 65/95, 114, 115, 116, 69, 104, 194
See application file for complete search history.

(56) References Cited

U.S. PATENT DOCUMENTS

| | | | | |
|---|---|---|---|---|
| 3,223,501 A | 12/1965 | Fredley et al. | ..................... | 65/25 |
| 3,595,725 A | 7/1971 | Coen | ................................ | 161/1 |
| 3,765,859 A | 10/1973 | Seymour | ......................... | 65/114 |
| 3,776,709 A * | 12/1973 | Melling et al. | .................. | 65/114 |
| 3,880,638 A * | 4/1975 | Hafner et al. | .................... | 65/116 |
| 3,883,339 A * | 5/1975 | Michalik et al. | ................. | 65/114 |
| 3,890,128 A | 6/1975 | Melling et al. | .................. | 65/116 |
| 4,004,901 A | 1/1977 | Starr | ............................... | 65/114 |
| 4,046,543 A | 9/1977 | Shields | ............................. | 65/25 |
| 4,445,921 A | 5/1984 | Bennett et al. | ................... | 65/114 |
| 4,913,720 A | 4/1990 | Gardon et al. | ................... | 65/114 |
| 5,772,717 A | 6/1998 | Kirschner et al. | .............. | 65/104 |
| 6,067,820 A | 5/2000 | Silander et al. | ................. | 65/114 |
| 6,094,943 A | 8/2000 | Okuda et al. | .................... | 65/114 |
| 6,427,488 B1 | 8/2002 | Vitkala et al. | ................. | 65/29.19 |
| 2005/0223746 A1 | 10/2005 | Yoshizawa et al. | ............. | 65/114 |
| 2006/0121281 A1 * | 6/2006 | Tamai et al. | .................. | 428/410 |

FOREIGN PATENT DOCUMENTS

| | | |
|---|---|---|
| BE | 729055 | 8/1969 |
| FR | 2 024 397 | 4/1969 |
| GB | 2 111 972 | 7/1983 |

OTHER PUBLICATIONS

Engineering Toolbox, "Overall Heat Transfer Coefficient", Oct. 3, 2003.*
"Tempering Glass with Modulating Cooling Schedules" by Robert Gardon, J. Am. Ceramic Soc. 71 [10] 876-78 (1988).

* cited by examiner

*Primary Examiner* — Matthew Daniels
*Assistant Examiner* — Cynthia Szewczyk
(74) *Attorney, Agent, or Firm* — Andrew C. Siminerio (57) ABSTRACT

A method of tempering a glass sheet heated to a tempering temperature includes cooling the glass sheet at a first heat transfer coefficient at a first quench station and cooling the glass sheet at a second heat transfer coefficient at a second quench station downstream of the first quench station. The second heat transfer coefficient is greater than the first heat transfer coefficient. In a multistage process of the invention, a plurality of quench stations could be used with each downstream quench station having a larger heat transfer coefficient than the previous upstream quench station.

8 Claims, 7 Drawing Sheets

Figure 1

FIGURE 2. Surface and Mid-Thickness Temperatures and Stresses for Conventional Tempering of 0.75" Thick Glass at 1182 Deg F [HTC=33 Btu/(hr ft2 DegF)]

Figure 3
Permanent Stress Distribution Through the Thickness for 0.750" Thick Glass in Figure 2

FIGURE 4. Surface and Mid-Thickness Temperatures and Stresses for Conventional Tempering of 0.75" Thick Glass at 1266 Deg F [HTC=49 Btu/(hr ft2 DegF)]

FIGURE 5. Surface and Mid-Thickness Temperatures and Stresses for 2 Stage Cooling of 0.75" Thick Glass at 1266 Deg F [HTC1=49 and HTC2=159 Btu/(hr ft2 DegF) @ 1.75 sec]

Figure 7
Permanent Stress Distribution Through the Thickness for 0.750" Thick Glass in Figure 6

APPARATUS AND METHOD FOR TEMPERING GLASS SHEETS

BACKGROUND OF THE INVENTION

1. Field of the Invention

This invention relates generally to tempering glass sheets and, more particularly, to tempering glass sheets using a multi-stage tempering process.

2. Description of the Current Technology

It is known to temper glass sheets to increase the strength or breaking resistance of the glass. Traditionally, this tempering is done either by chemical tempering or thermal tempering. In chemical tempering, relatively small ions, such as sodium, are replaced by larger ions, such as potassium, or smaller ions, such as lithium, are replaced by larger ions, such as sodium and/or potassium. The crowding of the larger ions into the spaces left by removal of the smaller ions produces a compression of the surface layers of the glass.

In thermally tempered glass, glass sheets are heated to an elevated temperature above the glass strain point near the glass softening point and then are chilled to cool the glass surface regions relatively rapidly while the inner regions of the glass cool at a slower rate. This differential cooling results in a compressive stress in the glass surface regions balanced by a tension stress in the interior of the glass. The resultant tempered glass has a much greater resistance to fracture than untempered glass. Also, in the event that the tempered glass does fracture, its breakage pattern is significantly different than that of untempered glass. Tempered glass typically shatters into small fragments which become smaller as the temper increases. Because the glass breaks into small fragments, it is less likely to cause injury due to laceration. Untempered glass typically fractures to form large pieces having sharp edges.

In a conventional thermal tempering process, the heated glass sheet is conveyed through a cooling chamber or "quench" in which the glass sheet is cooled rapidly from an initial furnace exit temperature, typically in the range of 1160° F. to 1300° F. (627° C. to 704° C.), to a quench exit temperature, typically in the range of 900° F. to 950° F. (482° C. to 510° C.), at which temperature the stresses (compression and tension) in the glass become permanently set. The actual temperature ranges utilized in the process are glass composition dependent. The glass viscosity, which is temperature dependent, along with other glass physical properties are the determining factors for setting process requirements.

In U.S. Pat. No. 4,913,720 to Gardon et al., glass sheets are tempered at a first cooling station with a first rate of heat transfer and then moved to a second cooling station to be cooled at a second rate of heat transfer, with the second rate of heat transfer being less than the first rate. The time is adjusted such that this process initially cools the surface of the glass sheet below the strain point, leaving the center above the strain point, after which the cooling rate is reduced. Thereafter, the second cooling rate cools both the center and the surface below the strain point. This modified tempering process results in tempered glass that mimics ion exchange glass. That is, the center tension is low and therefore the glass fractures into large pieces rather than small pieces as in conventionally tempered glass. Such glass is particularly useful for aircraft windshields so that even in the event of glass fracture, the pilot can more easily see through large pieces of broken glass rather than very small pieces of broken glass produced by the conventional tempering process. The Gardon process results in glass sheets having a high surface compression but a low center tension.

As a general rule, the higher the temper level, e.g., the higher the surface compression and center tension, the stronger or more fracture resistant is the glass sheet. Therefore, it would be advantageous to provide an apparatus and method for increasing the temper level of glass sheets above the temper level available with conventional tempering techniques. That is, to produce glass having relatively high surface compression as well as high center tension. Such uses include weather resistant (hurricane and typhoon resistant) windows, countertops or furniture surfaces, glass partitions (such as sporting partitions, e.g., hockey arena glass), stronger and/or lighter architectural, automobile or aircraft glass. For example, current hurricane resistant glass is typically formed from two sheets of heat strengthened or annealed glass that is laminated together with polyvinylbutyral. The polyvinylbutyral layer typically costs more than the two glass sheets. If this laminated structure could be replaced by a single, highly tempered glass sheet, weight and cost could be reduced. However, current thermal tempering processes do not lend themselves to such high tempering levels due to the processing methods used. Therefore, it would be advantageous to provide an apparatus and/or method that could be utilized to provide more highly tempered glass sheets than can be produced by conventional tempering processes.

SUMMARY OF THE INVENTION

A method of tempering a glass sheet heated to a tempering temperature comprises cooling the glass sheet at a first heat transfer rate, e.g., using a first heat transfer coefficient, at a first quench station, and cooling the glass sheet at a second heat transfer rate, e.g., using a second heat transfer coefficient, at a second quench station downstream of the first quench station in a continuous process. In a staged slower process, the two heat transfer rates could be applied one following the other in a single quench station. The second heat transfer rate is greater than the first heat transfer rate. For example, the first heat transfer coefficient can be greater than the second heat transfer coefficient. In a multistage process of the invention, a plurality of quench stations could be used with downstream quench stations having larger heat transfer rates than the upstream quench stations.

Another method of tempering a glass sheet heated to a tempering temperature comprises providing a quench station having at least one movable nozzle, transporting a heated glass sheet into the quench station, and moving the at least one nozzle from a first distance from the glass sheet to a second distance to vary the heat transfer rate applied to the glass sheet. In one non-limiting embodiment, the first distance can be greater than the second distance.

A further method of tempering a glass sheet heated to a tempering temperature comprises providing a quench station having at least one upper nozzle and at least one lower nozzle, transporting a heated glass sheet into the quench station, and moving the upper and/or lower nozzle from a first distance from the glass sheet to a second distance to vary a heat transfer rate applied to the glass sheet. In one non-limiting embodiment, the first distance can be greater than the second distance.

BRIEF DESCRIPTION OF THE DRAWINGS

The invention will be described with reference to the following drawing figures, wherein like reference numbers identify like parts throughout.

DESCRIPTION OF THE PREFERRED EMBODIMENTS

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Additionally, all documents, such as but not limited to issued patents and patent applications, referred to herein are to be considered to be "incorporated by reference" in their entirety.

Figure 1:
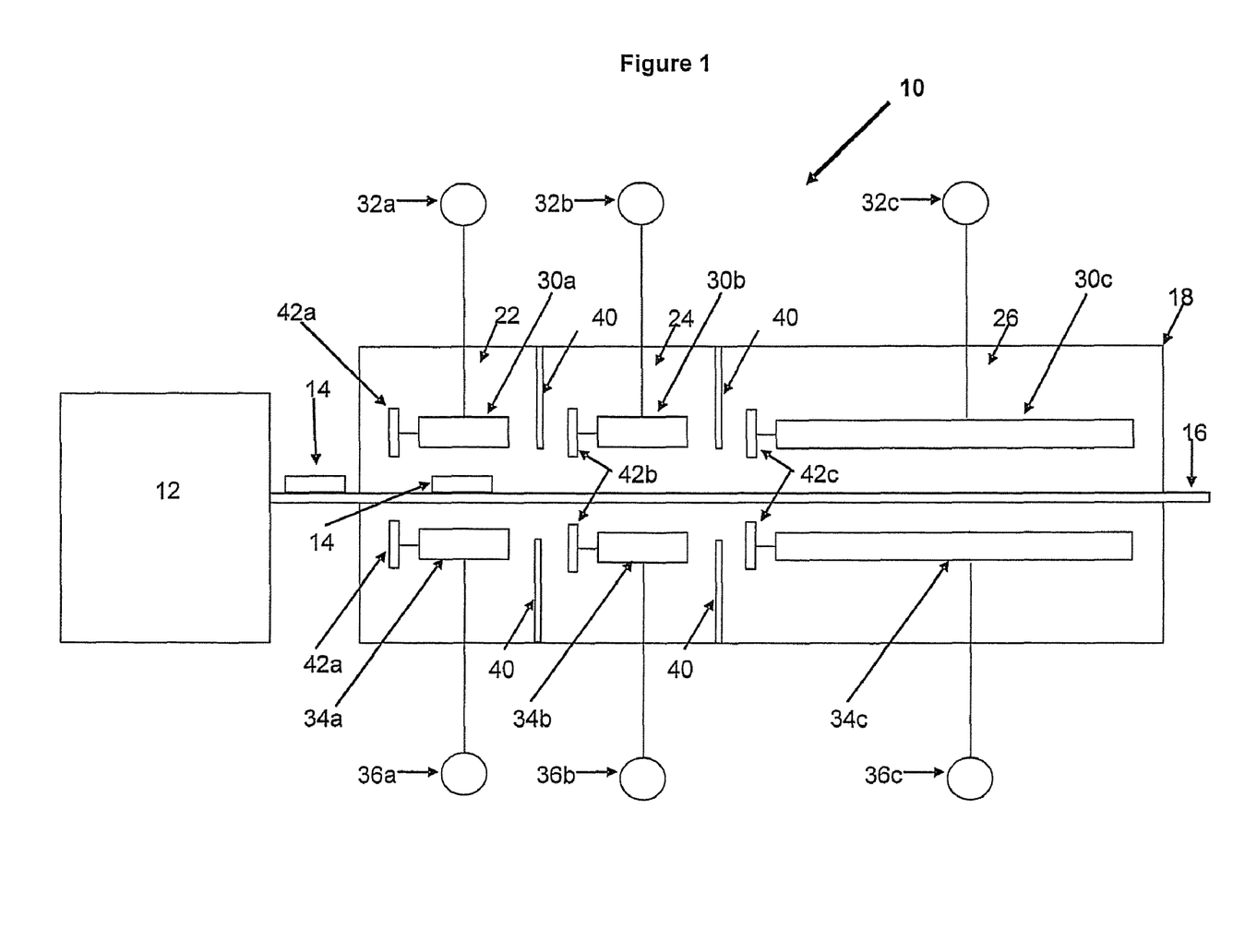
FIG. 1 is a side, schematic view of a tempering device incorporating features of the invention.

A non-limiting assembly for practicing the invention is shown in FIG. 1. The assembly 10 includes a conventional furnace 12 in which glass, such as in the form of individual glass sheets, is heated to a temperature above the glass transition temperature of the glass. For example, in one non-limiting embodiment, glass sheets 14 are heated to a temperature above 1160° F. (627° C.). The glass is then conveyed from the furnace 12 through the quench 18 of the invention. Although not limiting in the present invention, the glass can be conveyed on a separate conveyer 16 or over the surface of the bottom quench stations on a cushion of cooling fluid, such as air. For example, U.S. Pat. No. 3,223,501 discloses an apparatus having a plurality of spaced support zones. The quench 18 of the invention comprises one or more quench stations. In the illustrated non-limiting embodiment, the quench 18 comprises a plurality, i.e., two or more, quench stations. The illustrated non-limiting embodiment illustrates a first quench station 22, a second quench station 24, and a third quench station 26. However, it is to be understood that the quench 18 of the invention could contain any desired numbered of quench stations. Each quench station 22, 24, 26 comprises one or more cooling elements. Non-limiting examples of conventional cooling elements include slots (U.S. Pat. No. 4,046,543), nozzles or rosette modules. In the illustrated non-limiting embodiment, each quench station 22, 24, 26 includes a first or upper plenum 30a-30c which can be in the form of one or more nozzles directed toward the top of the conveyor 16 (or, if no separate conveyor is present, toward the top of the glass sheet 14). The nozzles are connected in any conventional manner, such as by pipes or duct, to a source 32a-32c, respectively, of cooling fluid. In one non-limiting embodiment, the cooling fluid comprises a gaseous fluid, such as air. Other cooling materials could also be used, such as but not limited to hydrophobic colloidal silica, a conventional sublimation quench (such as one using carbon dioxide), or a liquid quench, such as an oil quench or a liquid metal quench.

Each quench station 22, 24, 26 can also include a second or lower cooling element 34a-34c, such as a plenum or cooling nozzles, located below the conveyor 16 (i.e., directed toward the bottom of the glass sheet 14). The second cooling elements 34a-34c are connected in any conventional manner, such as by pipes or ducts, to a second source 36a-36c of cooling fluid. In one non-limiting embodiment, the second source 36a-36c of cooling fluid also comprises a cooling gas, such as air. As discussed above, other cooling materials could also be used, such as but not limited to hydrophobic colloidal silica, a conventional sublimation quench (such as using carbon dioxide), or a liquid quench, such as an oil quench or a liquid metal quench. Quench stations 22, 24, 26 can be defined or separated in any conventional manner, such as by curtains or partitions 40 that extend downwardly from the top of the quench 18 and upwardly from the bottom of the quench 18.

The quench stations 22, 24, 26 can also include one or more positioning devices 42a-42c such that the positions of the cooling elements 30a-30c, 34a-34c can be adjusted in the quench stations 22, 24, 26. For example, the positioning devices 42a-42c can be any conventional mechanical device that can move one or both of the cooling elements 30a-30c, 34a-34c towards or away from the conveyor 16 such that the distance of the first cooling element 30a-30c and/or corresponding second cooling element 34a-34c from the conveyor 16 can be adjusted. Additionally or alternatively, the fluid sources 32a-32c, 36a-36c can be configured to supply different fluids to the first cooling element 30a-30c or second cooling element 34a-34c, respectively, so as to provide different cooling rates at each station. Additionally or alternatively, the fluid sources 32a-32c, 36a-36c can be temperature regulated in any conventional manner to provide fluid of a predetermined temperature to the cooling elements 30a-30c, 34a-34c, so as to provide different cooling rates at each station.

Operation of the apparatus will now be described.

Glass articles, such as glass sheets 14, are heated in the furnace 12 to a temperature above the glass transition temperature of the glass. In one non-limiting embodiment, the glass sheets are heated to a temperature above 1160° F. (627° C.). However, as one of ordinary skill in the art will understand, the higher the temperature to which the glass sheets are heated, the higher the resultant surface compression will be.

The glass sheets 14 are transported into the quench 18 where they enter the first quench station 22. The cooling fluid is directed from the first cooling element 30a and/or second cooling element 34a toward the top and/or bottom of the glass sheet 14 to provide a first heat transfer rate. For example, a first heat transfer coefficient (HTC) can be utilized in the first quench station 22 for a first predetermined period of time.

The heat transfer coefficient is the proportionality constant between the heat removal rate from the glass surface (Q) and the temperature difference between the glass surface and the cooling fluid as it approaches the glass.

$$Q = HTC \times (T_{glass} - T_{fluid}) + q_{rad} \quad (I)$$

Q is the heat removal rate in Btu per hour square foot; HTC is the heat transfer coefficient in Btu per hour square foot degree Fahrenheit; $T_{glass}$ is the temperature of the glass at any given point in time; $T_{fluid}$ is the cooling fluid temperature at a corresponding time; $q_{rad}$ is heat lost by radiation. Depending upon the operational parameters, such as but not limited to the temperature of the glass, $q_{rad}$ could be relatively smaller as compared to the other heat transfer components.

During thermal tempering, the temper level (surface compression and center tension) of the glass is directly related to the rate of heat removal from the glass when cooling from a temperature above the glass transition temperature ($T_g$). As a general rule, the higher the initial glass temperature above $T_g$, the higher the resultant temper level. The faster or higher the cooling rate the higher the temper level. An effective means of increasing the temper level is to raise the HTC or decrease $T_{fluid}$ as discussed below.

The glass sheet 14 is then transported into the second quench station 24 where the cooling elements 30b, 34b direct cooling fluid toward the top and/or bottom of the glass sheet 14 for a second predetermined period of time. However, in the second quench station 24, the heat transfer rate is larger than the heat transfer rate of the first cooling station 22. For example, the heat transfer coefficient utilized at the second cooling station 24 (i.e. second heat transfer coefficient) can be larger than the heat transfer coefficient utilized at the first cooling station 22 (i.e. the first heat transfer coefficient). If additional quench stations (such as the third quench station 26) are present in the quench 18, the glass sheet 14 will then be directed into these subsequent quench stations, with each downstream quench station having an equal or larger heat transfer rate than the adjacent upstream quench station. For example, each downstream quench station can utilize an equal or larger heat transfer coefficient than the adjacent upstream quench station. The glass sheet 14 then exits the quench 18 at a temperature low enough to set the permanent surface compression and center tension caused by the tempering process and can be further cooled in any conventional manner to room temperature.

As will be appreciated by one skilled in the art, the heat transfer rate of the various quench stations 22, 24, 26 can be adjusted in any conventional manner. For example, this can be done by changing the temperature of the cooling fluid supplied to that quench station to change the heat removal rate. One can also increase the HTC by increasing the flow rate or velocity of the cooling fluid in the quench station, or decreasing the distance between the cooling elements and the glass surface, or varying the speed of the glass sheet through the quench station, just to name a few. For example, the first and second cooling elements 30a, 34a in the first quench station 22 can be at a first distance from the glass surface. The first and second cooling elements 30b, 34b at the second quench station 24 can be at a second distance from the glass surface, with the second distance being equal or less than the first distance. Alternatively, the fluid temperature can be lower and/or the fluid velocity or flow rate can be higher in the second quench station 24 than the first cooling station 22 such that the heat removal rate applied to the glass sheet 14 in the second quench station 24 is larger than that in the first quench station 22. In one non-limiting embodiment of the invention, the quench stations 22, 24, 26 are configured such that the stress level (surface tension) of the glass sheets in the cooling stations does not exceed 10,000 pounds per square inch (psi), such as less than or equal to 8,000 psi, such as less than or equal to 6,000 psi, such as less than or equal to 5,000 psi, such as less than or equal to 4,800 psi, to reduce the potential for glass breakage.

The invention can be practiced in the following exemplary manner. The heat transfer rates of all of the quench stations 22, 24, 26 can initially be set at the same level. For example, the initial heat transfer coefficients can all be the same at each of the quench stations. The heated glass sheets 14 can then be transported through the quench 18. The heat transfer rates at all of the quench stations 22, 24, 26 can be increased to the point where the glass sheets 14 begin to break or crack. Once this "defect point" has been reached, the heat transfer rates at the quench stations 22, 24, 26 can be decreased until no glass breakage is present. The first quench station 22 can remain at this first heat transfer rate, e.g., utilizing the first heat transfer coefficient. Next, the heat transfer rate of the second quench station 24 is increased until the point where the glass sheets in the second quench station 24 begin to break or crack. This can be done by utilizing a second heat transfer coefficient that is larger than the first heat transfer coefficient. The heat transfer rate of the second quench station 24 can then be decreased until no such breaking or cracking occurs. For example, the second heat transfer coefficient can be decreased. This second heat transfer rate at the second quench station 24 will be larger than the first heat transfer rate at the first quench station 22. For example, the second heat transfer coefficient can be larger than the first heat transfer coefficient. In similar manner, the heat transfer rates at any further quench stations can be adjusted accordingly, for example, by adjusting the heat transfer coefficients at those stations. In one non-limiting embodiment, the glass sheet can be cooled at successive quench stations downstream of the first quench station until the glass center temperature is below the glass transition range or until the contribution of the successive stations to the final surface compression is substantially zero.

The time that the glass sheets 14 remain in the various quench stations 22, 24, 26 can be adjusted, for example, based on the temperature of the glass. For example, the higher the initial temperature of the glass sheet, the faster the glass sheet should be conveyed from the first quench station 22 into the second quench station 24. Also, the thinner the glass sheet, the faster the glass sheet should be transported from the first quench station 22 to the second quench station 24.

In one non-limiting embodiment, the cooling behavior of the glass sheet can be estimated from the process parameters by using the heat transfer calculation capability of the commercially available ANSYS finite element computer program commercially available from ANSYS, Inc. of Canonsburg, Pa.

The present invention provides glass having a tempering level (surface compression and center tension) significantly higher than that previously possible using conventional thermal tempering processes. The glass made in accordance with the invention can be utilized for various applications, such as those discussed above, e.g., security and/or shatter resistant glass.

As can be appreciated by one skilled in the art, during the tempering process, the outside surfaces of the glass (including the edges) initially go into tension when cooling begins in the quench. The higher the cooling rate the greater the tensile stress. This tension stress, which is balanced by compression in the interior, begins to decay due to the viscous strain of the glass. The higher the initial temperature of the glass going into the quench the more rapidly this proceeds. When the initial surface tension stress produced by the cooling exceeds the basic strength of the glass (nominally 4800 to 10,000 Psi), fracture can occur. The propensity for breakage follows roughly a normal distribution with respect to applied tensile stress. Fracture usually occurs at a glass edge, which is weaker than the surface and typically cools faster than the surface. This phenomenon limits the cooling rate that can be applied in a conventional single stage quench system. The maximum practical furnace exit temperature for the glass is determined by the method of supporting the weight of the glass (tongs, rolls, fluid film, etc.) and the final acceptable optical quality. The higher the temperature, the lower the glass viscosity and the more the glass will deform with time under its own weight, thus degrading the optical quality. Overall, for a given support method, the required glass quality and acceptable frequency of quench breakage determines the allowable exit temperature and thus the final compressive stress level that can be produced.

For any given thickness of glass initially heated to a temperature above the glass transition temperature range with a uniform cooling rate applied to its surfaces (typical of a conventional single stage quench), the maximum final compressive stress level produced in the glass surfaces reaches a plateau with increasing initial glass temperature. As the cooling rate is increased, the plateau for glass compression stress level is reached at ever increasing initial glass temperature levels. In order to produce high glass surface compression stress levels from tempering, high quenching rates (i.e. high heat transfer rates) and furnace exit temperatures are required. The present invention overcomes the breakage and optical problems produced by conventional thermal tempering methods that utilize relatively high exit temperatures, which are necessary for producing highly tempered glass. With the present invention, a lower exit temperature can be used to achieve the same level of compression stress. In one non-limiting embodiment, the present invention utilizes a multi-stage quench system based on heat transfer level. An initial higher cooling rate stage that produces a glass tension level just below the fracture limit for a given glass thickness and quench entrance temperature level is followed by an even higher cooling rate stage that imparts a large thermal gradient through the thickness of the glass, producing a high surface compressive stress level without significant glass breakage or optical problems. These high surface compression stress levels are not achievable with a single stage heat transfer level quench system of the known art due to glass breakage and optical quality problems.

In the above-described embodiment, a plurality of quench stations were used in the practice of the invention. However, it is to be understood that the invention could also be practiced using a single quench station having a plurality of regions of differing heat transfer rates. This could be practiced in any conventional manner, such as but not limited to having a quench station with one or more cooling elements, e.g. nozzles, above and/or below a conveyor with the nozzles positioned at a decreasing distance from the conveyor in a direction of glass travel. That is, the nozzles at the entrance end of the quench station are farther from the conveyor than the nozzles at the exit end of the conveyor. In one non-limiting embodiment of the invention, the nozzles can be positioned along a predetermined slope to provide a substantially continuous heat removal rate gradient through the quench station. In another non-limiting embodiment, the nozzles could be positioned in groups to provide several cooling regions yielding a more step-wise heat removal rate gradient. In another non-limiting embodiment the nozzles could be at the same distance from the conveyor along the quench station but the flow rate, fluid temperature, fluid type, etc., of the nozzles can differ along the length of the quench station such that the nozzles nearer the exit end of the quench station provide a higher heat transfer rate than the nozzles near the entrance end. In another non-limiting embodiment, the upper and/or lower nozzles can be movable such that they are initially positioned at a first distance from the glass in the quench station and then are moved inwardly, i.e. toward the upper and/or lower surface of the glass, to vary, e.g., increase, the heat transfer rate. If desired, the nozzles could be moved outwardly to decrease the heat transfer rate.

Practice of the invention as described herein will produce the maximum temper level possible for any given glass composition and thickness for any initial glass quench entrance temperature level utilized by a tempering process. The final glass temper level produced by this invention will be significantly higher than that produced by a conventional single stage tempering process operating at a nominal glass quench heat removal rate and entrance temperature level.

EXAMPLE 1

Table 1 shows the cooling and tempering parameters calculated using the ANSYS finite element analysis program commercially available from ANSYS, Inc., of Canonsburg, Pa. for a conventional process compared to those for processes incorporating features of the invention.

TABLE 1

ANSYS Calculations to Reduce Maximum Surface Tension and Increase Permanent Residual Stresses Using 100 Deg. F. Quench Temp

Figure 2:
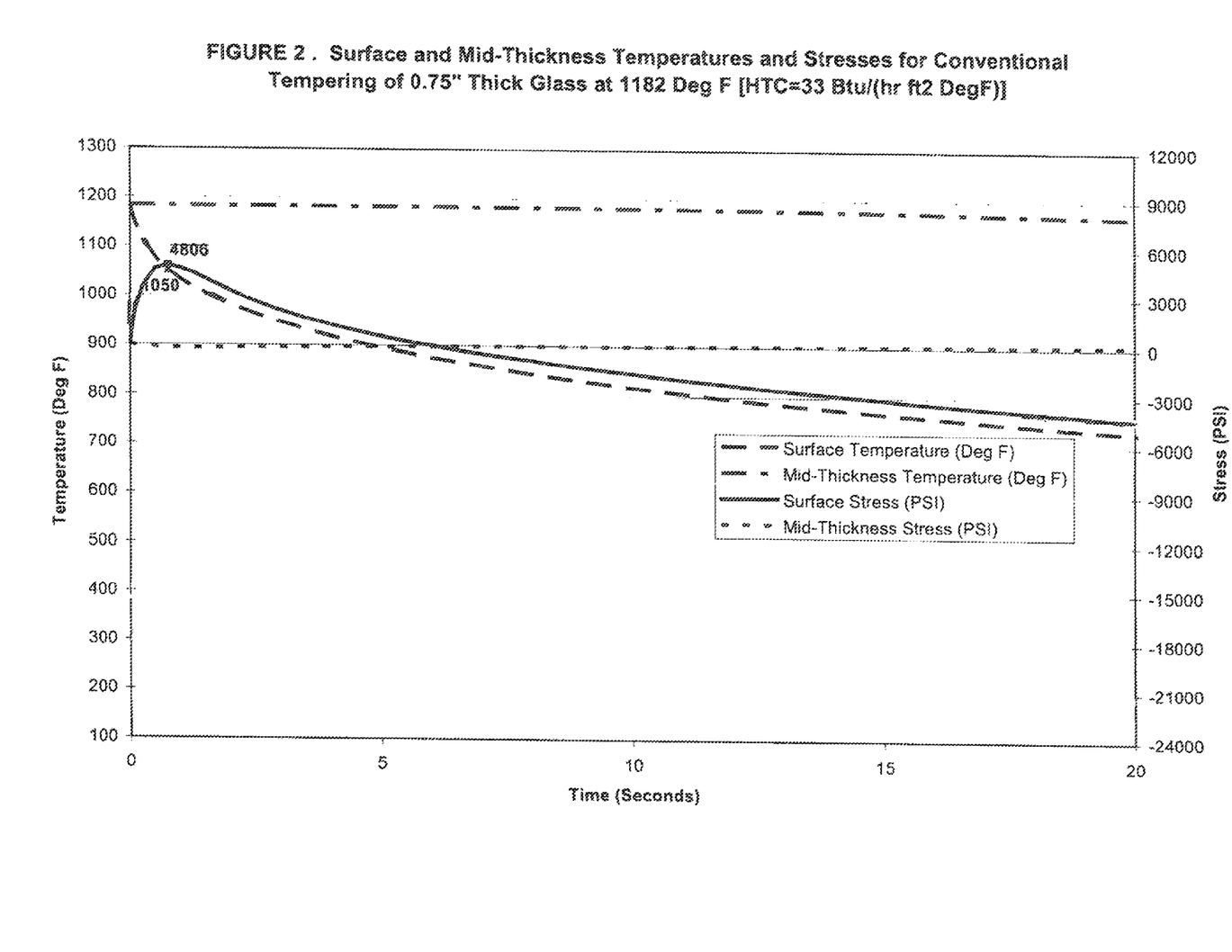
FIG. 2 is a graph of surface and mid-thickness temperatures and stresses for a first conventional tempering process shown in Table 1.
Figure 3:
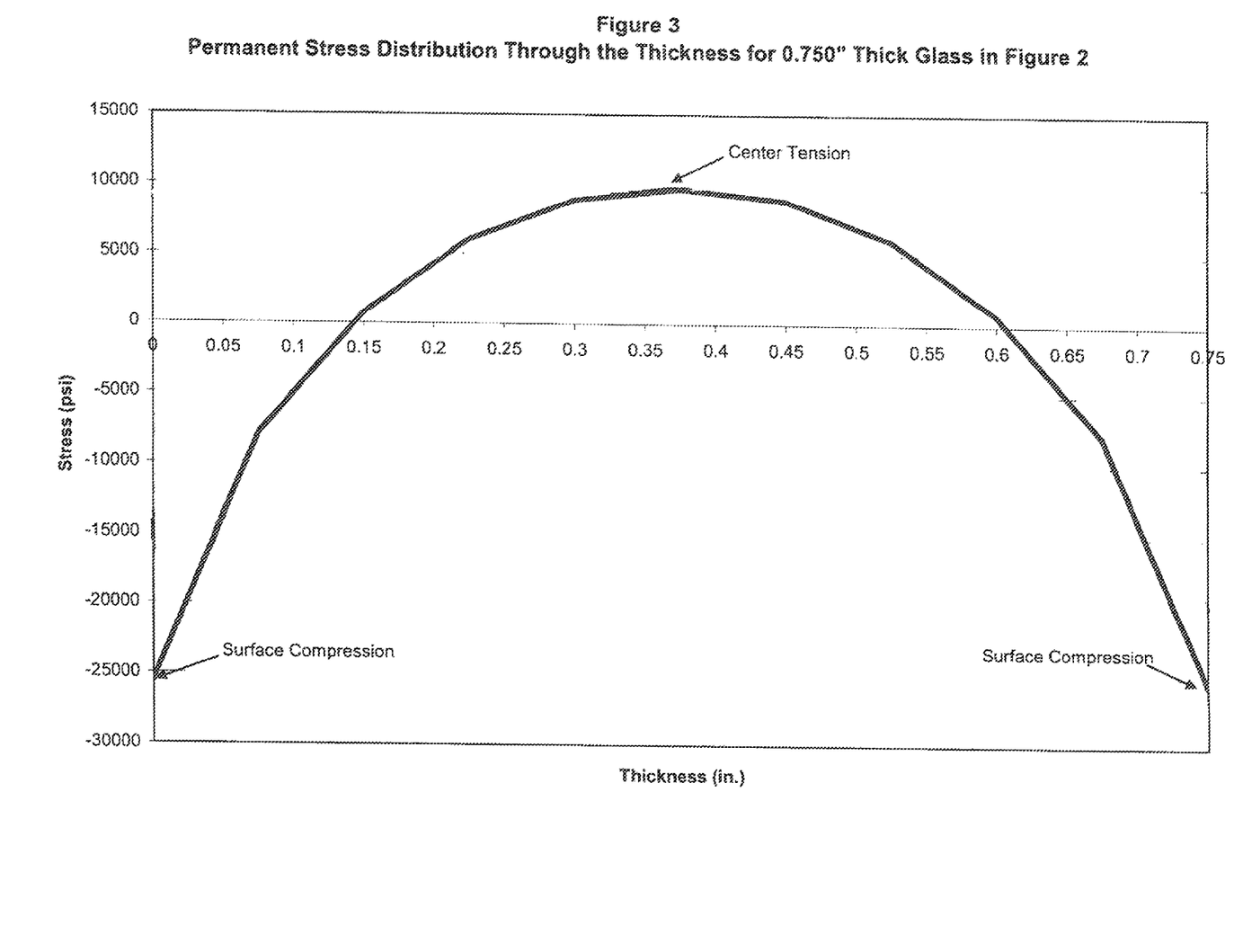
FIG. 3 is a graph of the permanent stress through the thickness for the conventional tempering process in FIG. 2.
Figure 4:
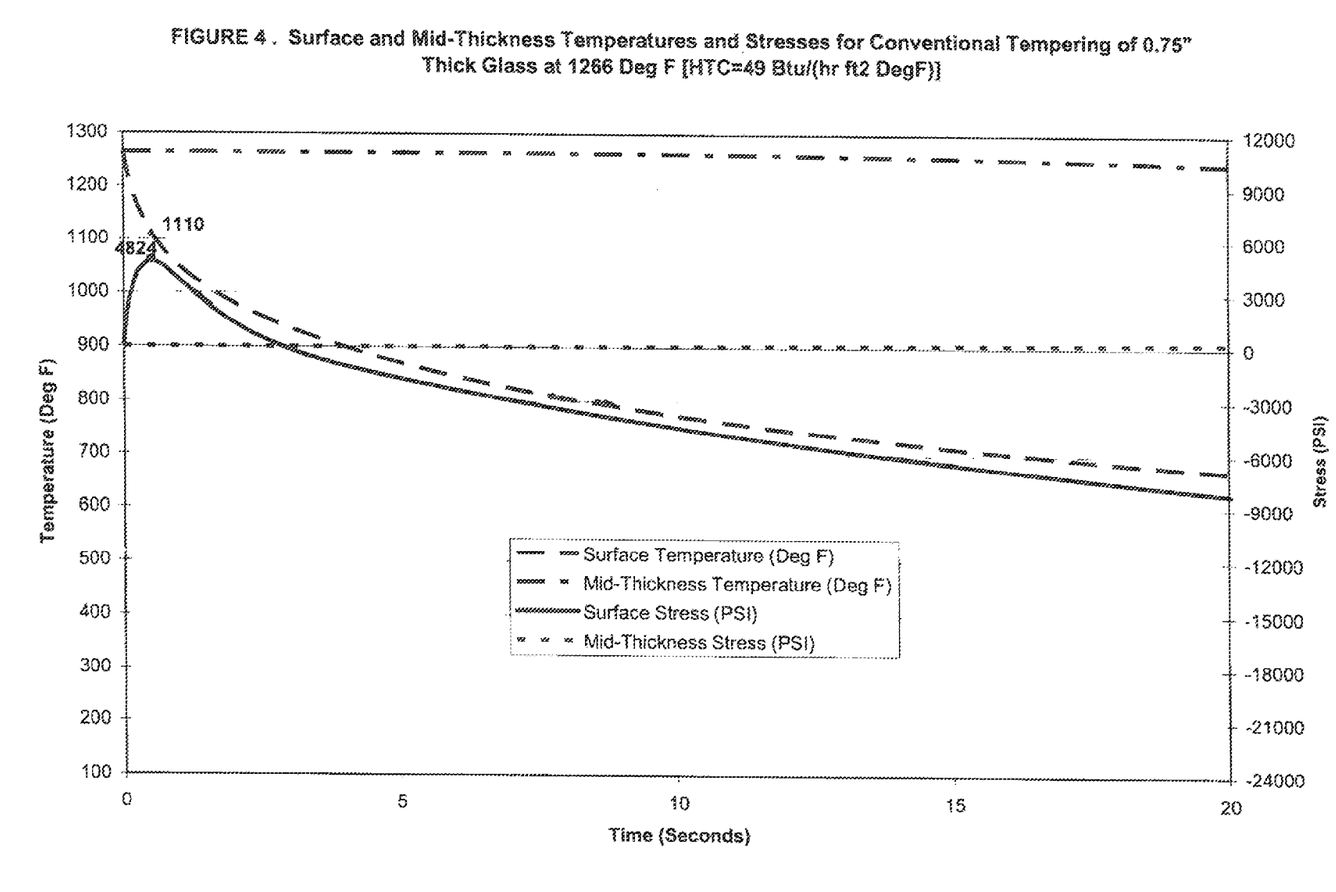
FIG. 4 is a graph of surface and mid-thickness temperatures and stresses for a second conventional tempering process shown in Table 1.

| Sample No. | Glass Thickness (inch) | Initial Glass Temperature (° F.) | Initial Heat Transfer Coefficient BTU/(hr-ft$^2$-° F.) | Initial Maximum Surface Tension | | Glass Temperature When Initial Maximum Surface Tension Occurs | | Second Heat Transfer Coefficient Cumulative Shift Time (sec) |
|---|---|---|---|---|---|---|---|---|
| | | | | Time (sec) | Value (psi) | Center (° F.) | Surface (° F.) | |
| Conventional Tempering 0.75" at 1182 Deg F. See FIG. 2 and 3 | | | | | | | | |
| 1 | 0.750 | 1182 | 33 | 0.75 | 4,086 | 1182 | 1050 | |
| Tempering 0.75" at 1266 Deg F. See FIG. 4 | | | | | | | | |
| 2 | 0.750 | 1266 | 49 | 0.50 | 4,824 | 1266 | 1110 | |

TABLE 1-continued

Figure 5:
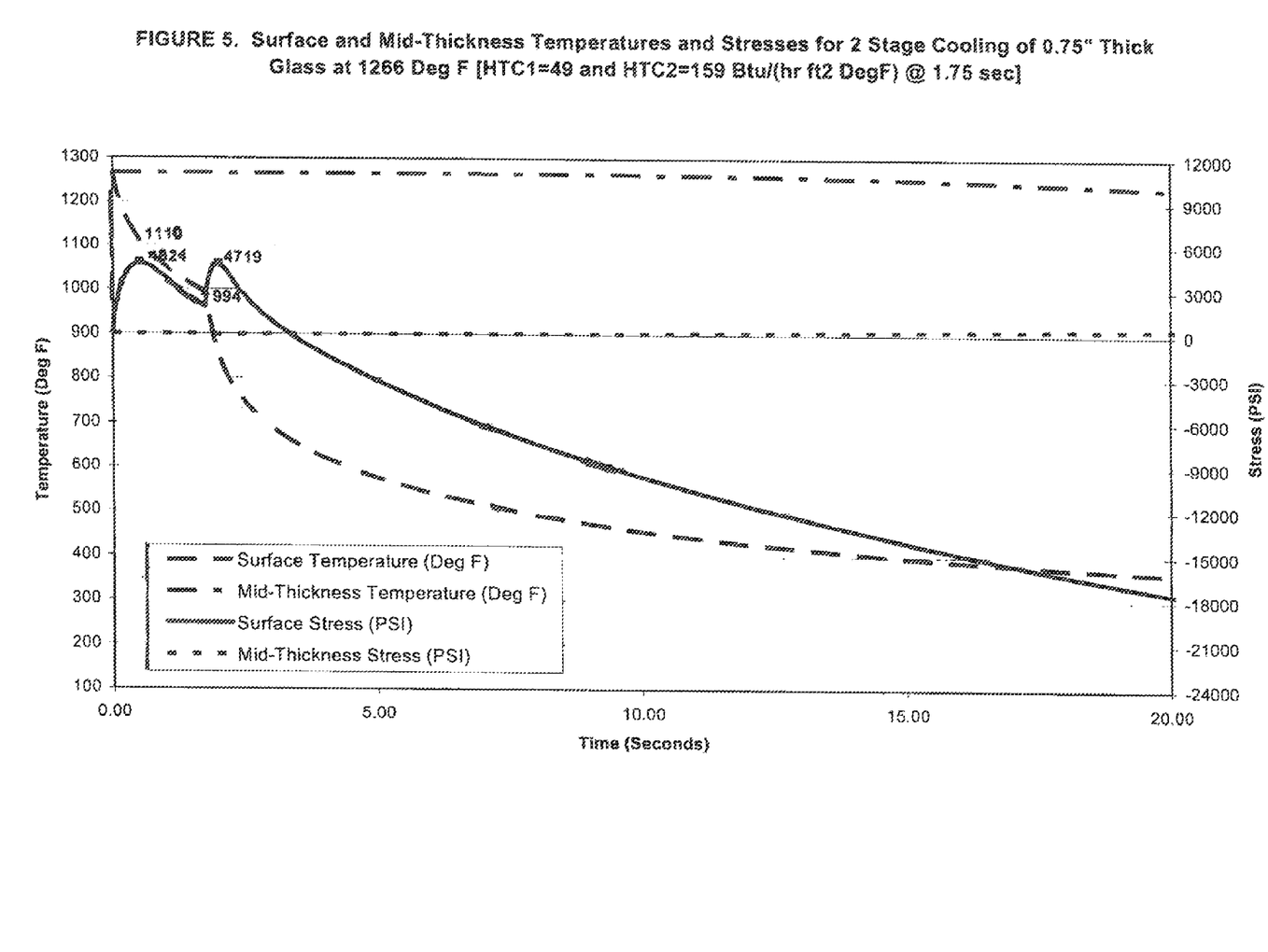
FIG. 5 is a graph showing surface and mid-thickness temperatures and stresses for a two-stage cooling process of the invention.

ANSYS Calculations to Reduce Maximum Surface Tension
and Increase Permanent Residual Stresses Using 100 Deg. F. Quench Temp Two Stage Tempering 0.75" at 1266 Deg F. See FIG. 5

| 3 | 0.750 | 1266 | 49 | 0.50 | 4,824 | 1266 | 1110 | 1.75 |

Figure 6:
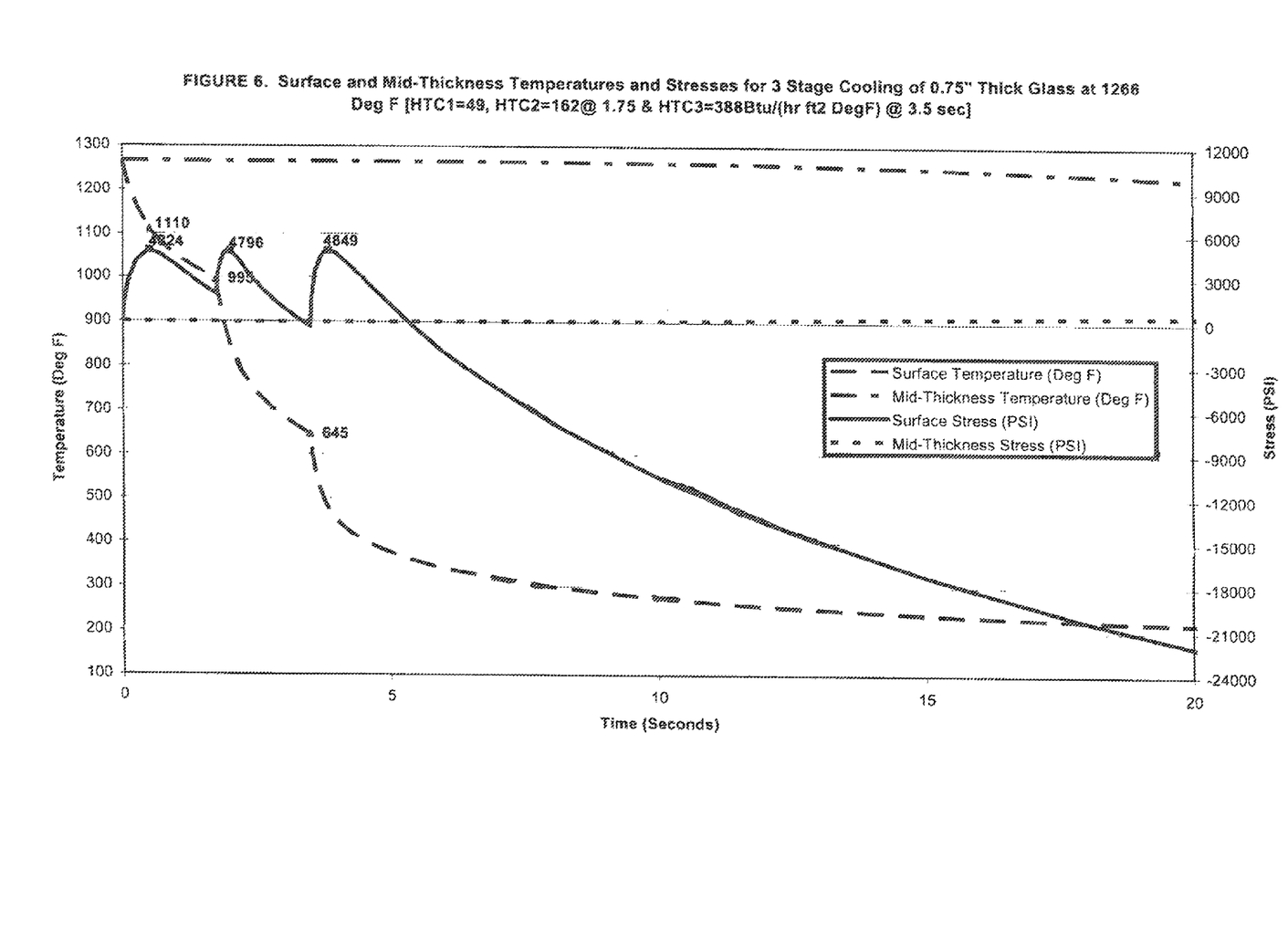
FIG. 6 is a graph showing surface and mid-thickness temperatures and stresses for a three-stage cooling process of the invention.
Figure 7:
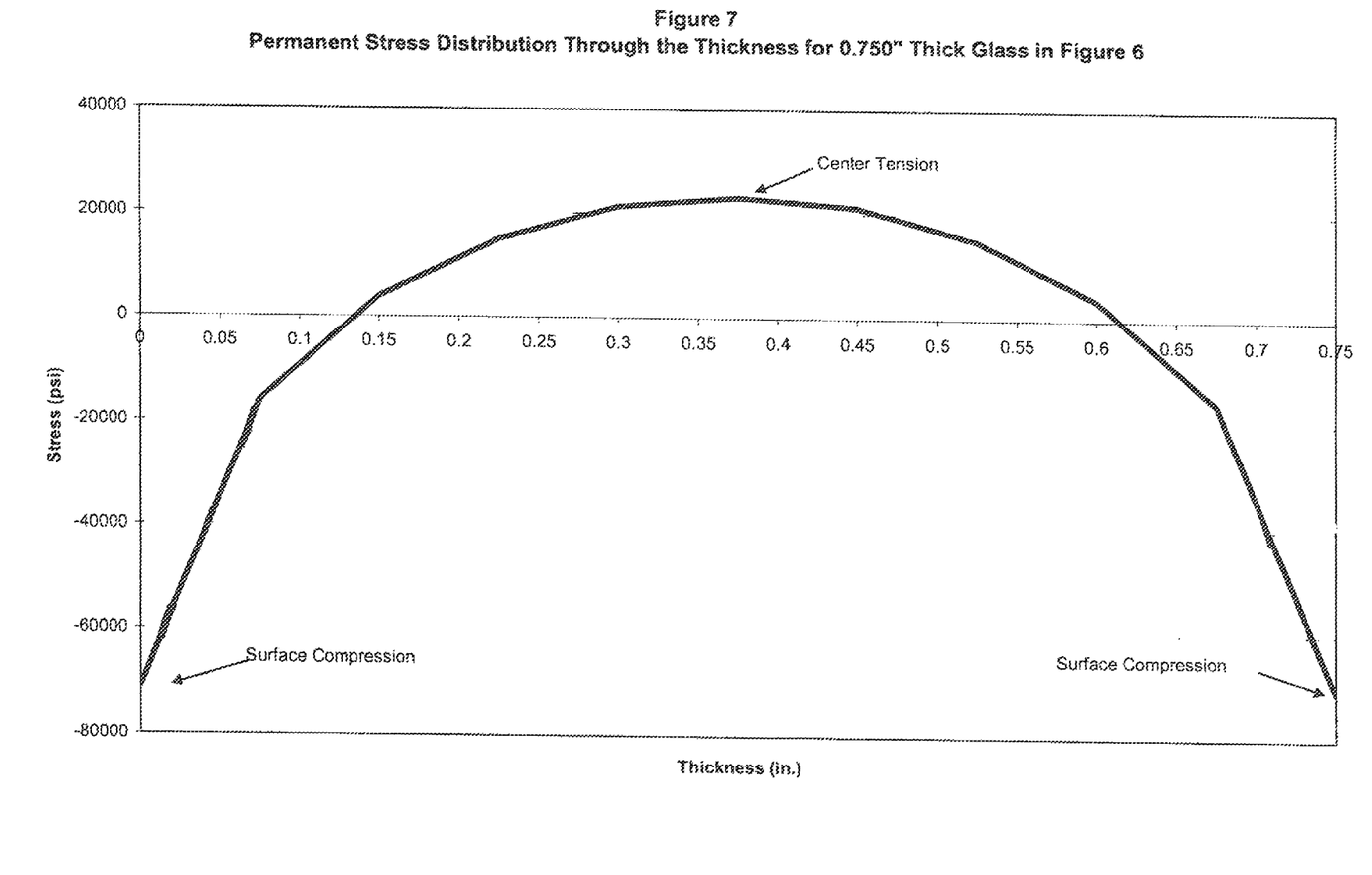
FIG. 7 is a graph of the permanent stresses through the glass thickness for the three stage cooling process of FIG. 6.

Multi-Stage Quenching Tempering 0.75" at 1266 Deg F. See FIGS. 6 and 7

| 4 | 0.750 | 1266 | 49 | 0.50 | 4,824 | 1266 | 1110 | 1.75 |

| Sample No. | Second Heat Transfer Coefficient Value Btu/(hr-ft²-° F.) | Surface Stress at 2nd Heat Transfer Coefficient Value (psi) | Second Maximum Surface Tension Cumulative Shift Time (sec) | Value (psi) | Center/Surface Temperature at 2nd Heat Transfer Coefficient Center (° F.) | Surface (° F.) | Third Heat Transfer Coefficient Cumulative Shift Time (sec) |
|---|---|---|---|---|---|---|---|

Conventional Tempering 0.75" at 1182 Deg F. See FIG. 2 and 3

| 1 | | | | | | | |

Tempering 0.75" at 1266 Deg F. See FIG. 4

| 2 | | | | | | | |

Two Stage Tempering 0.75" at 1266 Deg F. See FIG. 5

| 3 | 159 | 1,807 | 2.00 | 4,719 | 1266 | 994 | |

Multi-Stage Quenching Tempering 0.75" at 1266 Deg F. See FIGS. 6 and 7

| 4 | 162 | 1,807 | 2.00 | 4,796 | 1266 | 994 | 3.50 |

| Sample No. | Third Heat Transfer Coefficient Value Btu/(hr-ft²-° F.) | Surface Stress at 3rd Heat Transfer Coefficient Value (psi) | Third Maximum Surface Tension Cumulative Shift Time (sec) | Value (psi) | Center/Surface Temperature at 3rd Heat Transfer Coefficient Center (° F.) | Surface (° F.) | Residual Surface Compression Value (psi) | Residual Center Tension Value (psi) |
|---|---|---|---|---|---|---|---|---|---|

Conventional Tempering 0.75" at 1182 Deg F. See FIG. 2 and 3

| 1 | | | | | | | | −25,518 | 9,672 |

Tempering 0.75" at 1266 Deg F. See FIG. 4

| 2 | | | | | | | | −36,622 | 12,348 |

Two Stage Tempering 0.75" at 1266 Deg F. See FIG. 5

| 3 | | | | | | | | −60,547 | 19,859 |

Multi-Stage Quenching Tempering 0.75" at 1266 Deg F. See FIGS. 6 and 7

| 4 | 388 | −336 | 3.85 | 4,849 | 1266 | 645 | −70,863 | 23,105 |

In Table 1, the "Initial Maximum Surface Tension" column notes the time after quenching begins (time "0", i.e. the time after the initial heat transfer rate is applied to the heated glass sheet) that the glass reaches a predetermined maximum surface tension. In the illustrated processes, the maximum surface tension was kept at or below about 4,800 psi to minimize glass breakage. For example, Sample No. 3 reached a surface tension of 4,824 psi at 0.5 seconds after quenching began utilizing an initial heat transfer coefficient of 49. The "Glass Temperature When Initial Maximum Surface Tension Occurs" notes the center and surface temperatures of the glass sheet at the 0.5 second time. The "Second Heat Transfer Coefficient" column notes the cumulative time (i.e. from time 0) when the second heat transfer coefficient was initiated. In Sample No. 3, a second heat transfer coefficient of 159 was started at 1.75 seconds from time 0. The column "Surface Stress at $2^{nd}$ Heat Transfer Coefficient" notes the surface stress of the glass at the time the second heat transfer coefficient was begun. The column "Second Maximum Surface Tension" notes the cumulative time (i.e. from time 0) that the glass reached the maximum surface tension during application of the second heat transfer coefficient. For example, Sample No. 3 reached a surface tension of 4,719 at a cumulative time of 2 seconds (i.e. 2 seconds from time 0). The column "Center/Surface Temperature at $2^{nd}$ nd Heat Transfer Coefficient" notes the center and surface temperatures of the glass sheet when the second heat transfer coefficient was initiated. The columns utilized for the illustrated three stage quenching process conform to the analysis discussed immediately above.

As can be seen in Table 1, the first and second samples were tempered using a conventional tempering process in which a uniform heat transfer coefficient, either 33 or 49 Btu/hr/ft²/° F., were utilized for the entire quench cycle. However, by increasing the heat transfer coefficient from 33 to 49 and increasing the initial temperature from 1182° F. to 1266° F. (the increase in temperature allows for a higher heat transfer coefficient without glass breakage), the glass residual surface compression increased from −25,518 to −36,622 psi and the residual center tension increased from 9,672 to 12,348 psi. This represents a change in surface compression of about 44% ((36,622−25,518)/25,518).

However, practicing the process of the present invention can dramatically increase both the residual surface compression and the residual center tension produced in the glass. As shown in Table 1, the third example illustrates a two-stage tempering process of the present invention. In this sample, the glass at an initial temperature of 1266° F. was quenched using an initial heat transfer coefficient of 49 Btu/hr/ft$^2$/° F. in a first cooling station for 1.75 seconds and then transferred into a second cooling station having a second heat transfer coefficient of 159 Btu/hr/ft$^2$. While both the second and third samples were of the same thickness (0.75 inch) and initial temperature (1266° F.), the tempering process of the present invention results in a residual surface compression of −60,547 psi and a residual center tension of 19,859 psi in the glass. This result represents an increase in glass surface compression of 65% over that produced from the conventional tempering process of Sample 2, while not increasing the glass surface tension level above that produced by the conventional tempering process, thereby retaining the same propensity for breakage as the conventional tempering process.

Sample 4 is a comparative sample illustrating that the residual surface compression and residual center tension can be further increased by adjusting to a third even higher heat transfer coefficient at a later time in a third quench station. This result represents an increase in glass surface compression of 93% ($\{[70863-36622]/36622\}\times100\%$) over that provided by the conventional tempering process.

EXAMPLE 2

Table 2 below illustrates the residual surface compression levels that can be produced for various glass sheet thicknesses with varying glass quench entrance temperatures and heat transfer coefficients, while not exceeding a glass surface tension level of 4,800 psi. These results were calculated utilizing the conventional ANSYS finite element program.

TABLE 2

Maximum Residual Surface Compression (SC) Based on Minimum Tempering Heat Transfer Coefficients and Switch Times Required To Keep The Maximum Surface Tension Approximately Less Than 4800 PSI
Calculated Residual Surface Compression (SC) in (PSI)

| | Glass Thickness (Inches) | | | | | | | | |
|---|---|---|---|---|---|---|---|---|---|
| | 0.04 | | | 0.07 | | | 0.09 | | |
| Initial Glass Temperature (Deg F.) | Initial Heat Transfer Coef. (Btu/Hr/Ft2/Deg F.) | Time Of Switch To 2nd Heat Transfer Coef. (Sec.) | Second Heat Transfer Coef. (Btu/Hr/Ft2/Deg F.) | Initial Heat Transfer Coef. (Btu/Hr/Ft2/Deg F.) | Time Of Switch To 2nd Heat Transfer Coef. (Sec.) | Second Heat Transfer Coef. (Btu/Hr/Ft2/Deg F.) | Initial Heat Transfer Coef. (Btu/Hr/Ft2/Deg F.) | Time Of Switch To 2nd Heat Transfer Coef. (Sec.) | Second Heat Transfer Coef. (Btu/Hr/Ft2/Deg F.) |
| 1182 | 116 | 0.18 | 149 | 80 | 0.25 | 104 | 77 | 0.35 | 98 |
| (SC) | −5253 | | −5455 | −8753 | | −9229 | −10745 | | −11520 |
| (% Increase) | 0 | | 3.8 | 0 | | 5.4 | 0 | | 7.2 |
| (Mod % Incr.) | | | 3.8 | | | 5.4 | | | 7.2 |
| 1210 | 116 | 0.14 | 169 | 93 | 0.2 | 130 | 84 | 0.25 | 126 |
| (SC) | −7010 | | −7564 | −11158 | | −12861 | −13771 | | −15873 |
| (% increase) | 33.4 | | 44.0 | 27.5 | | 46.9 | 28.2 | | 47.7 |
| (Mod % Incr.) | | | 10.5 | | | 19.5 | | | 19.6 |
| 1238 | 130 | 0.1 | 200 | 103 | 0.15 | 185 | 98 | 0.15 | 162 |
| (SC) | −9617 | | −10930 | −14533 | | −18237 | −17472 | | −21583 |
| (% Increase) | 83.1 | | 108.1 | 66.0 | | 108.4 | 62.6 | | 100.9 |
| (Mod % Incr.) | | | 25.0 | | | 42.3 | | | 38.3 |
| 1266 | 121 | 0.04 | 200 | 109 | 0.05 | 187 | 106 | 0.08 | 211 |
| (SC) | −11930 | | −15379 | −17601 | | −23297 | −20689 | | −28969 |
| (% Increase) | 127.1 | | 192.8 | 101.1 | | 166.2 | 92.5 | | 169.6 |
| (Mod % Incr.) | | | 65.7 | | | 65.1 | | | 77.1 |
| 1294 | 131 | 0.015 | 191 | 122 | 0.02 | 206 | 119 | 0.03 | 235 |
| (SC) | −13845 | | −17533 | −19785 | | −26986 | −23071 | | −33510 |
| (% Increase) | 163.6 | | 233.8 | 126.0 | | 208.3 | 114.7 | | 211.9 |
| (Mod % Incr.) | | | 70.2 | | | 82.3 | | | 97.2 |

| | Glass Thickness (Inches) | | | | | | | | |
|---|---|---|---|---|---|---|---|---|---|
| | 0.125 | | | 0.196 | | | 0.25 | | |
| Initial Glass Temperature (Deg F.) | Initial Heat Transfer Coef. (Btu/Hr/Ft2/Deg F.) | Time Of Switch To 2nd Heat Transfer Coef. (Sec.) | Second Heat Transfer Coef. (Btu/Hr/Ft2/Deg F.) | Initial Heat Transfer Coef. (Btu/Hr/Ft2/Deg F.) | Time Of Switch To 2nd Heat Transfer Coef. (Sec.) | Second Heat Transfer Coef. (Btu/Hr/Ft2/Deg F.) | Initial Heat Transfer Coef. (Btu/Hr/Ft2/Deg F.) | Time Of Switch To 2nd Heat Transfer Coef. (Sec.) | Second Heat Transfer Coef. (Btu/Hr/Ft2/Deg F.) |
| 1182 | 67 | 0.475 | 91 | 55 | 0.75 | 81 | 54 | 0.9 | 78 |
| (SC) | −13714 | | −15062 | −18300 | | −20726 | −21396 | | −24012 |
| (% Increase) | 0 | | 9.8 | 0 | | 13.3 | 0 | | 12.2 |
| (Mod % Incr.) | | | 9.8 | | | 13.3 | | | 12.2 |
| 1210 | 78 | 0.25 | 108 | 66 | 0.25 | 86 | 70 | 0.5 | 108 |
| (SC) | −17517 | | −20003 | −22665 | | −25519 | −27081 | | −31649 |

TABLE 2-continued

Maximum Residual Surface Compression (SC) Based on Minimum Tempering Heat Transfer Coefficients and Switch Times Required To Keep The Maximum Surface Tension Approximately Less Than 4800 PSI
Calculated Residual Surface Compression (SC) in (PSI)

| | | | | | | | | | |
|---|---|---|---|---|---|---|---|---|---|
| (% increase) | 27.7 | | 45.9 | 23.9 | | 39.4 | 26.6 | | 47.9 |
| (Mod % Incr.) | | | 18.1 | | | 15.6 | | | 21.3 |
| 1238 | 93 | 0.15 | 145 | 78 | 0.25 | 144 | 84 | 0.31 | 144 |
| (SC) | −21770 | | −26523 | −27405 | | −35056 | −32100 | | −39729 |
| (% Increase) | 58.7 | | 93.4 | 49.8 | | 91.6 | 50.0 | | 85.7 |
| (Mod % Incr.) | | | 34.7 | | | 41.8 | | | 35.7 |
| 1266 | 101 | 0.1 | 200 | 98 | 0.15 | 186 | 94 | 0.25 | 198 |
| (SC) | −27003 | | −34489 | −31932 | | −42524 | −35888 | | −48501 |
| (% Increase) | 96.9 | | 151.5 | 74.5 | | 132.4 | 67.7 | | 126.7 |
| (Mod % Incr.) | | | 54.6 | | | 57.9 | | | 59.0 |
| 1294 | 129 | 0.05 | 234 | 122 | 0.08 | 204 | 123 | 0.10 | 173 |
| (SC) | −29363 | | −39940 | −37694 | | −47020 | −42825 | | −49029 |
| (% Increase) | 114 | | 191.2 | 106 | | 184 | 100.2 | | 160.8 |
| (Mod % Incr.) | | | 77.1 | | | 77.7 | | | 60.7 |

| | Glass Thickness (Inches) | | | | | | | | |
|---|---|---|---|---|---|---|---|---|---|
| | 0.378 | | | 0.5 | | | 0.75 | | |
| Initial Glass Temperature (Deg F.) | Initial Heat Transfer Coef. (Btu/Hr/Ft2/Deg F.) | Time Of Switch To 2nd Heat Transfer Coef. (Sec.) | Second Heat Transfer Coef. (Btu/Hr/Ft2/Deg F.) | Initial Heat Transfer Coef. (Btu/Hr/Ft2/Deg F.) | Time Of Switch To 2nd Heat Transfer Coef. (Sec.) | Second Heat Transfer Coef. (Btu/Hr/Ft2/Deg F.) | Initial Heat Transfer Coef. (Btu/Hr/Ft2/Deg F.) | Time Of Switch To 2nd Heat Transfer Coef. (Sec.) | Second Heat Transfer Coef. (Btu/Hr/Ft2/Deg F.) |
| 1182 | 45 | 1 | 65 | 40 | 2 | 73 | 33 | 3.0 | 68 |
| (SC) | −25454 | | −29265 | −27013 | | −33778 | −25522 | | −34990 |
| (% Increase) | 0 | | 15.0 | 0 | | 25.0 | 0 | | 37.1 |
| (Mod % Incr.) | | | 15.0 | | | 25.0 | | | 37.1 |
| 1210 | 62 | 0.9 | 114 | 54 | 1 | 99 | 42 | 1.625 | 88 |
| (SC) | −32579 | | −39855 | −34536 | | −43465 | −31420 | | −44594 |
| (% Increase) | 28.0 | | 56.6 | 27.8 | | 60.9 | 23.1 | | 74.7 |
| (Mod % Incr.) | | | 28.6 | | | 33.1 | | | 51.6 |
| 1238 | 75 | 0.5 | 144 | 67 | 0.86 | 141 | 48 | 1.5 | 121 |
| (SC) | −37877 | | −48326 | −38868 | | −52850 | −35285 | | −53070 |
| (% Increase) | 48.8 | | 89.9 | 43.9 | | 95.6 | 38.3 | | 107.9 |
| (Mod % Incr.) | | | 41.1 | | | 51.8 | | | 69.7 |
| 1266 | 84 | 0.4 | 190 | 79 | 0.625 | 182 | 49 | 1.75 | 162 |
| (SC) | −44277 | | −57651 | −45182 | | −61303 | −36622 | | −60547 |
| (% Increase) | 73.9 | | 126.5 | 67.3 | | 126.9 | 43.5 | | 139.3 |
| (Mod % Incr.) | | | 52.5 | | | 59.7 | | | 95.8 |
| 1294 | 93 | 0.35 | 203 | | | | | | |
| (SC) | −56714 | | −61410 | | | | | | |
| (% Increase) | 122.8 | | 141.3 | | | | | | |
| (Mod % Incr.) | | | 44.8 | | | | | | |

In Table 2, the surface compression (SC) under the Initial Heat Transfer Coefficient represents what the final surface compression would be if the initial heat transfer coefficient were used for the entire quench (i.e., what a conventional quench would yield). The surface compression value under the Second Heat Transfer Coefficient represents the surface compression resulting from the multistage quench of the invention. It appears from Table 2 that as glass thickness increases and initial glass temperature increases, the effect of the second cooling stage with a higher heat transfer coefficient is greater. In Table 2, "% Increase" represents the percent increase in the surface compression due to (a) the effects of increasing the initial temperature of the glass or (b) the combined effects of increasing the initial temperature of the glass and the second cooling step at an increased heat transfer rate (as reflected by a higher heat transfer coefficient), when compared to the initial surface compression at the first initial glass temperature. For example, referring to the 0.07 inch sample in Table 2, the initial glass temperature was 1182° F. and the glass had a surface compression of −8753 psi. When the glass processing included a second cooling step at a higher heat transfer rate, the surface compression increased to −9229 psi, i.e. a % Increase of 5.4% ({[9229−8753]/8753}×100%). Furthermore, when the initial glass temperature was increased to 1238° F., the glass had a surface compression of −14533 psi. This represents a surface compression increase of 66% ({[14533−8753]/8753}×100%) over the surface compression of the glass at the first initial temperature and using a single stage quench. Furthermore, when a second cooling step at a higher heat transfer rate is used, the surface compression increased to −18237 psi, i.e. a surface compression increase of 108.4% ({[18237−8753]/8753}×100%). Table 2 further includes the percent increase in surface compression due to the second cooling step (indicated by "Mod % lncr."). More specifically and referring to the example discussed above, the % Increase due to increased temperature and second cooling step was 108.4% while the % Increase due only to an higher initial temperature was 66%. As a result, the Mod % Incr. in the surface compression due to the second cooling step was 42.3% (108.4%−66%).

EXAMPLE 3

Table 3 illustrates the residual surface compression level that can be produced for various glass sheet thicknesses with glass quench entrance temperatures of 1266° F. and 1294° F. using a three stage quench of the present invention while not exceeding a glass surface tension of 4800 psi. These results were also calculated using the ANSYS finite element program.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

TABLE 3

Three Stage Tempering Calculations to Increase Permanent Residual Stresses Using 100 Deg. F. Quench Temp

| Glass Thickness (inch) | Initial Heat Transfer Coefficient BTU/(hr-ft$^2$-° F.) | Initial Maximum Surface Tension | | Glass Temperature When Initial Maximum Surface Tension Occurs | | Second Heat Transfer Coefficient | |
|---|---|---|---|---|---|---|---|
| | | Time (sec) | Value (psi) | Center (° F.) | Surface (° F.) | Cumulative Shift Time (sec) | Value Btu/(hr-ft$^2$-° F.) |
| Initial Quench Glass Temperature = 1266 Deg F. | | | | | | | |
| 0.040 | 121 | 0.02 | 4,794 | 1266 | 1192 | 0.04 | 200 |
| 0.070 | 109 | 0.02 | 4,798 | 1266 | 1195 | 0.05 | 187 |
| 0.090 | 109 | 0.02 | 4,824 | 1266 | 1197 | 0.08 | 211 |
| 0.125 | 101 | 0.03 | 4,788 | 1266 | 1193 | 0.10 | 200 |
| 0.196 | 98 | 0.03 | 4,792 | 1266 | 1190 | 0.15 | 186 |
| 0.250 | 94 | 0.05 | 4,816 | 1266 | 1173 | 0.25 | 198 |
| 0.378 | 84 | 0.11 | 4,826 | 1266 | 1144 | 0.40 | 177 |
| 0.500 | 79 | 0.25 | 4,807 | 1266 | 1106 | 0.63 | 182 |
| 0.750 | 49 | 0.50 | 4,824 | 1266 | 1110 | 1.75 | 162 |
| Initial Quench Glass Temperature = 1294 Deg F. | | | | | | | |
| 0.040 | 131 | 0.01 | 4,748 | 1294 | 1230 | 0.01 | 191 |
| 0.070 | 122 | 0.01 | 4,809 | 1294 | 1234 | 0.02 | 206 |
| 0.090 | 119 | 0.01 | 4,805 | 1294 | 1232 | 0.03 | 235 |
| 0.125 | 120 | 0.01 | 4,808 | 1294 | 1229 | 0.05 | 234 |
| 0.196 | 122 | 0.02 | 4,810 | 1294 | 1209 | 0.08 | 204 |
| 0.250 | 123 | 0.03 | 4,816 | 1294 | 1205 | 0.10 | 173 |
| 0.378 | 93 | 0.12 | 4,813 | 1294 | 1150 | 0.35 | 208 |

| Glass Thickness (inch) | Surface Stress at 2nd Heat Transfer Coefficient value (psi) | Second Maximum Surface Tension | | Center/Surface Temperature at 2nd Heat Transfer Coefficient | | Third Heat Transfer Coefficient | |
|---|---|---|---|---|---|---|---|
| | | Cumulative Shift Time (sec) | Value (psi) | Center (° F.) | Surface (° F.) | Cumulative Shift Time (sec) | Value Btu/(hr-ft$^2$-° F.) |
| Initial Quench Glass Temperature = 1266 Deg F. | | | | | | | |
| 0.040 | 3,659 | 0.048 | 4,805 | 1265 | 1159 | 0.08 | 293 |
| 0.070 | 3,510 | 0.061 | 4,802 | 1266 | 1157 | 0.10 | 272 |
| 0.090 | 2,612 | 0.098 | 4,799 | 1266 | 1134 | 0.18 | 312 |
| 0.125 | 2,591 | 0.12 | 4,789 | 1266 | 1126 | 0.20 | 302 |
| 0.196 | 2,835 | 0.18 | 4,798 | 1266 | 1102 | 0.30 | 299 |
| 0.250 | 2,338 | 0.30 | 4,840 | 1266 | 1068 | 0.50 | 339 |
| 0.378 | 2,613 | 0.47 | 4,791 | 1266 | 1044 | 0.80 | 352 |
| 0.500 | 2,767 | 0.70 | 4,834 | 1266 | 1015 | 1.25 | 381 |
| 0.750 | 1,807 | 2.00 | 4,796 | 1266 | 994 | 3.50 | 388 |
| Initial Quench Glass Temperature = 1294 Deg F. | | | | | | | |
| 0.040 | 4,408 | 0.018 | 4,847 | 1294 | 1219 | 0.03 | 300 |
| 0.070 | 3,984 | 0.025 | 4,812 | 1294 | 1214 | 0.04 | 293 |
| 0.090 | 3,241 | 0.04 | 4,806 | 1294 | 1199 | 0.06 | 329 |
| 0.125 | 2,982 | 0.06 | 4,818 | 1294 | 1173 | 0.10 | 357 |
| 0.196 | 3,605 | 0.10 | 4,848 | 1294 | 1141 | 0.16 | 344 |
| 0.250 | 4,213 | 0.12 | 4,802 | 1294 | 1125 | 0.20 | 318 |
| 0.378 | 2,909 | 0.40 | 4,894 | 1294 | 1061 | 0.70 | 310 |

TABLE 3-continued

Three Stage Tempering Calculations to Increase Permanent Residual Stresses Using 100 Deg. F. Quench Temp

| Glass Thickness (inch) | Surface Stress at 3rd Heat Transfer Coefficient Value (psi) | Third Maximum Surface Tension | | Center/Surface Temperature at 3rd Hest Transfer Coefficient | | Residual Surface Compression Value (psi) | Residual Center Tension Value (psi) |
|---|---|---|---|---|---|---|---|
| | | Cumulative Shift Time (sec) | Value (psi) | Center (° F.) | Surface (° F.) | | |
| Initial Quench Glass Temperature = 1266 Deg F. | | | | | | | |
| 0.040 | 3,392 | 0.09 | 4,799 | 1266 | 1065 | −17,487 | 10,302 |
| 0.070 | 3,430 | 0.11 | 4,790 | 1266 | 1058 | −26,761 | 13,582 |
| 0.090 | 2,934 | 0.18 | 4,759 | 1266 | 944 | −32,589 | 16,244 |
| 0.125 | 2,848 | 0.23 | 4,782 | 1266 | 980 | −39,100 | 18,177 |
| 0.196 | 2,521 | 0.34 | 4,793 | 1266 | 947 | −48,845 | 20,877 |
| 0.250 | 1,724 | 0.56 | 4,796 | 1266 | 868 | −55,150 | 22,795 |
| 0.378 | 1,187 | 0.90 | 4,800 | 1266 | 1044 | −64,850 | 24,502 |
| 0.500 | 955 | 1.40 | 4,747 | 1266 | 761 | −70,704 | 25,232 |
| 0.750 | −336 | 3.85 | 4,849 | 1266 | 645 | −70,863 | 23,105 |
| Initial Quench Glass Temperature = 1294 Deg F. | | | | | | | |
| 0.040 | 3,664 | 0.035 | 4,816 | 1294 | 1163 | −22,001 | 10,798 |
| 0.070 | 3,868 | 0.046 | 4,785 | 1294 | 1138 | −31,875 | 14,343 |
| 0.090 | 3,783 | 0.07 | 4,802 | 1294 | 1091 | −38,526 | 16,907 |
| 0.125 | 3,273 | 0.11 | 4,775 | 1294 | 1043 | −46,634 | 19,600 |
| 0.196 | 2,943 | 0.18 | 4,752 | 1294 | 1013 | −56,247 | 21,965 |
| 0.250 | 2,984 | 0.23 | 4,946 | 1294 | 1006 | −60,484 | 22,671 |
| 0.378 | 514 | 0.78 | 3,465 | 1294 | 829 | −70,080 | 24,926 |

What is claimed is:

1. A method of tempering a glass sheet heated to a tempering temperature, comprising:
   (a) cooling the glass sheet with a first gaseous cooling fluid at a first heat transfer rate for a first period of time using a first heat transfer coefficient in the range of 33 Btu/hr/ft$^2$/° F. to 129 Btu/hr/ft$^2$/° F.;
   (b) cooling the glass sheet with a second gaseous cooling fluid at a second heat transfer rate after step (a), with the second heat transfer rate being greater than the first heat transfer rate and using a second heat transfer coefficient in the range of 144 Btu/hr/ft$^2$/° F. to 235 Btu/hr/ft$^2$/° F.; and
   (c) cooling the glass sheet with a third gaseous cooling fluid at a third heat transfer rate after step (b), with the third heat transfer rate being greater than the second heat transfer rate and using a third heat transfer coefficient in the range of 272 to 388 Btu/hr/ft$^2$/° F.,
   wherein the first gaseous cooling fluid, the second gaseous cooling fluid, and the third gaseous cooling fluid can be the same or different, and
   wherein cooling with the first gaseous cooling fluid, cooling with the second gaseous cooling fluid, and cooling with the third gaseous cooling fluid are each conducted such that the glass sheet in each case has a maximum surface tension of ≦5,000 psi.

2. The method of claim 1, including performing steps (a), (b), and (c) in a single quench station.

3. The method of claim 1, comprising:
   cooling the glass sheet at the first heat transfer rate at a first quench station;
   cooling the glass sheet at the second heat transfer rate at a second quench station downstream of the first quench station; and
   cooling the glass sheet at the third heat transfer rate at a third quench station downstream of the second quench station.

4. The method of claim 1, further comprising:
   cooling the glass sheet at successive quench stations until the glass center temperature is below the glass transition range or until the contribution of the successive stations to the final surface compression is substantially zero.

5. The method of claim 1, including maintaining a glass sheet surface tension of less than 4800 psi during the tempering process.

6. The method of claim 1, wherein the first, second, and third heat removal rates are adjusted by adjusting at least one of the temperature of a cooling fluid, a nozzle to glass distance, fluid flow rate, fluid pressure, and type of cooling fluid.

7. A glass sheet made by the method of claim 1.

8. The method of claim 1, wherein the first gaseous cooling fluid remains in a gaseous state during step (a), the second gaseous cooling fluid remains in a gaseous state during step (b), and the third gaseous cooling fluid remains in a gaseous state during step (c).

* * * * *